(12) United States Patent
Iversen (10) Patent No.: US 6,454,272 B1
(45) Date of Patent: Sep. 24, 2002

(54) SEALING ARRANGEMENT AND A SEALING MEMBER THEREFOR

(75) Inventor: Gert Iversen, Helsingør (DK)

(73) Assignee: W. S. Shamban Europa A/S, Helsinger (DK)

( * ) Notice: Subject to any disclaimer, the term of this patent is extended or adjusted under 35 U.S.C. 154(b) by 23 days.

(21) Appl. No.: 09/589,913

(22) Filed: Jun. 7, 2000

Related U.S. Application Data
(60) Provisional application No. 60/138,382, filed on Jun. 9, 1999.

(30) Foreign Application Priority Data

Jun. 8, 1999 (DK) .................................... 1999 00809
Apr. 3, 2000 (DK) .................................... 2000 00551

(51) Int. Cl.[7] .................................................. F16J 9/20
(52) U.S. Cl. ...................................... 277/436; 277/589
(58) Field of Search .............................. 277/434, 436, 277/448, 582, 589

(56) References Cited

U.S. PATENT DOCUMENTS

| 1,490,716 | A |   | 4/1924  | Schwennker     |
|-----------|---|---|---------|----------------|
| 3,300,225 | A | * | 1/1967  | Shepler        |
| 3,601,419 | A | * | 8/1971  | Fern           |
| 3,603,603 | A | * | 9/1971  | Woodson        |
| 4,268,045 | A | * | 5/1981  | Traub          |
| RE31,171  | E | * | 3/1983  | Brent          |
| 4,917,390 | A | * | 4/1990  | Lee et al.     |
| 5,149,107 | A | * | 9/1992  | Maringer et al.|
| 5,249,813 | A |   | 10/1993 | Botto          |
| 5,392,964 | A | * | 2/1995  | Stapp et al.   |
| 5,607,166 | A | * | 3/1997  | Gorman         |
| 5,921,166 | A | * | 7/1999  | Machida et al. |
| 6,105,970 | A | * | 8/2000  | Siegrist et al.|

FOREIGN PATENT DOCUMENTS

| DE | 2325000 | 12/1974 |              |
|----|---------|---------|--------------|
| DE | 3026063 | 2/1982  | ... F16J/9/06 |
| DE | 3521525 | 11/1986 | ... F16J/15/16 |

(List continued on next page.)

Primary Examiner—Anthony Knight
Assistant Examiner—John L. Beres
(74) Attorney, Agent, or Firm—Howard J. Klein (57) ABSTRACT

A sealing arrangement is designed for sealing a space that extends between high and low pressure areas and that is defined between a first apparatus part and a cylindrical surface of a second apparatus part, the first and second apparatus parts being mutually moveable in a reciprocating manner along the axis of said cylindrical surface. The sealing arrangement includes an annular sealing member of resilient material having a radially outer peripheral surface extending between axially opposite first and second end surfaces facing the high and low pressure areas, respectively, and a radially inner peripheral surface for providing a sealing engagement with the cylindrical surface of the second apparatus part at a contact area, and for defining with the cylindrical surface a first space widening or diverging from the contact area toward the low pressure area. A compression ring surrounds the annular sealing member, and is in contact with the outer peripheral surface of the annular sealing member so as to press the inner peripheral surface thereof into close contact with the cylindrical surface of the second apparatus part at the contact area. The axial sectional view of at least part of the outer peripheral surface of the annular sealing member comes into contact with the compression ring, defining such convex contour that in an unstressed condition of the sealing member, the radial distance between such part of the outer peripheral surface and the radially innermost part of the inner peripheral surface decreases in an axial direction toward the second end surface and the low pressure area, with the radius or radii of curvature of the convex contour being at least 0.4 times the total axial length or width of the annular sealing member.

49 Claims, 6 Drawing Sheets

FOREIGN PATENT DOCUMENTS

| | | | |
|---|---|---|---|
| DE | 3835505 | 5/1990 | ............ F16J/15/16 |
| EP | 0418732 | 3/1991 | ............ F16J/15/16 |
| WO | 91/ 10088 | 7/1991 | ............ F16J/15/32 |
| WO | 92/15807 | 9/1992 | ............ F16J/15/32 |

* cited by examiner

SEALING ARRANGEMENT AND A SEALING MEMBER THEREFOR

CROSS-REFERENCE TO RELATED APPLICATION

This application claims priority from U.S. provisional application NO. 60/138,382; filed Jun. 9, 1999.

FEDERALLY SPONSORED RESEARCH OR DEVELOPMENT

Not Applicable

BACKGROUND OF THE INVENTION

The present invention relates to a sealing arrangement for sealing a space, which extends between high and low pressure areas and which is defined between a first apparatus part and a cylindrical surface of a second apparatus part, the first and second apparatus parts being mutually movable in a reciprocating manner along the axis of said cylindrical surface.

As an example, the apparatus part may be part of a housing or a cylinder, and the second apparatus part may be a piston rod connected to a double acting piston. A sealing arrangement of this type is disclosed for example in WO 92/15807. This known sealing arrangement comprises an annular sealing member of resilient material and a compression ring, such as an O-ring, surrounding the annular sealing member. The radially outer peripheral surface of the annular sealing member extends between axially opposite first and second end surfaces facing said high and low pressure areas, respectively. The annular sealing member also has a radially inner peripheral surface for sealing engagement with the cylindrical surface of the second apparatus part at a contact area thereof. The purpose of the compression ring is to press the contact area of the inner peripheral surface of the sealing member into tight sealing engagement with the cylindrical surface of the second apparatus part. This means that ideally the annular contact area between the compression ring and the outer peripheral surface of the annular sealing member should be positioned radially opposite to the contact area between the sealing member and the cylindrical surface of the second apparatus part.

In actual practice, however, the pressure difference between the high and low pressure areas varies substantially, and an increasing pressure difference tends to force the compression ring and, consequently, also the contact area between the compression ring and the annular sealing member, in a direction toward the low pressure area. In order to substantially maintain the sealing pressure between the contact area of the inner peripheral surface part of the sealing member and the cylindrical surface of the second apparatus part when the compression ring is forced toward the low pressure area, the outer peripheral surface of the sealing member is chamfered at its low pressure end. Thus, the annular sealing member of the known sealing arrangement has an outer peripheral surface defining an obtuse angle in an axial sectional view.

It has been found that the compression ring, which may, for example, be an O-ring made from an elastomeric material, has a relatively short useful lifetime, because eventually the compression ring becomes permanently deformed.

SUMMARY OF THE INVENTION

The present invention provides a sealing arrangement of the type discussed above with an increased efficiency and a prolonged useful economic lifetime.

Thus, the present invention provides a sealing arrangement for sealing a space, which extends between high and low pressure areas and which is defined between a first apparatus part and a cylindrical surface of a second apparatus part, the first and second apparatus parts being mutually moveable in a reciprocating manner along the axis of said cylindrical surface, said sealing arrangement comprising an annular sealing member of resilient material having a radially outer peripheral surface extending between axially opposite first and second end surfaces facing said high and low pressure areas, respectively, and a radially inner peripheral surface for providing a sealing engagement with the cylindrical surface of the second apparatus part at a contact area, and for defining with the cylindrical surface a first space widening or diverging from said contact area towards the low pressure area; and a compression ring surrounding the annular sealing member, the compression ring being in contact with the outer peripheral surface of the annular sealing member so as to press the inner peripheral surface thereof into close contact with the cylindrical surface of the second apparatus part at said contact area; the axial sectional view of at least part of the outer peripheral surface of the annular sealing member coming into contact with the compression ring defining such convex contour that in an unstressed condition of the sealing member, the radial distance between such part of the outer peripheral surface and the radially innermost part of the inner peripheral surface is decreasing in an axial direction toward the second end surface and the low pressure area, the radius or radii of curvature of the convex contour being at least 0.4 times the total axial length or width of the annular sealing member.

It has been found that in the known sealing arrangements the efficiency of the compression ring is eventually reduced because during operation the compression ring is pressed into contact with a rather sharp annular edge defined by the outer peripheral surface of the sealing member and corresponding to the vertex of the aforesaid obtuse angle. It has been found that the useful lifetime of the sealing arrangement according to the invention is substantially prolonged compared with the lifetime of the known sealing arrangements when the convex contour of the outer peripheral surface of the annular sealing member is rounded as described above.

The radius of curvature of such rounded surfaces preferably does not exceed twice the total axial length or width of the annular sealing member, and in the presently preferred embodiment the radius or radii of curvature is/are at least 0.6 and preferably about 0.85 times the total axial length of the annular sealing member.

The convex contour of the outer peripheral surface of the sealing member may extend along the total axial length or width of the sealing member. However, when the radial distance between the outer peripheral surface of the sealing member and the cylindrical surface of the second apparatus part is gradually decreasing toward the second end surface of the sealing member or toward the low pressure area, the compression ring may tend to be forced or extruded into the space defined between the second end surface of the sealing member and an adjacent opposite surface of the first apparatus part. In order to counteract such tendency, the convex axial sectional contour of the outer peripheral surface part may continuously merge into a concave sectional contour adjacent to the second end surface of the sealing member. In such case the convex contour may merge into the concave contour at an inflexion spaced from said second end surface by a distance of 0.05–0.25 times the total axial length or width of the sealing member. The end part of the sectional contour adjacent to the second end surface of the sealing member and the longitudinal axis of the sealing arrangement preferably defines therebetween an angle from −10° to +45°. Thus, the end part of the sectional contour and the longitudinal axis of the sealing arrangement may be converging, but are preferably diverging toward the low pressure area.

The radially inner peripheral surface of the sealing member may include a first section, which extends between the first end surface of the sealing member and the contact area, and which has a minimum diameter substantially exceeding the maximum diameter of a second section of the inner peripheral surface defining said gradually widening or diverging space. Thus, the contacting area is defined as an intermediate part between the first and second sections. Thereby it is secured that the radially inwardly directed pressure applied by the compression ring is concentrated at the predetermined contact area.

The sealing member and the compression ring of the sealing arrangement according to the invention may be retained in their mutual positions in any suitable manner. In the preferred embodiment, however, the annular sealing member and the compression ring are arranged within an annular channel or groove which is formed in the first apparatus part and defines an annular opening opposite the cylindrical surface of the second apparatus part, said channel having a bottom wall for sealing engagement with the compression ring, and opposite first and second side walls positioned opposite to the first and second end surfaces, respectively, of the sealing member.

According to a further embodiment of the sealing arrangement, the outer peripheral surface of the sealing member may define a convex axial contour having a first section adjacent to the first end surface of the sealing member and a second section adjacent to the second end surface of the sealing member, the first and second end sections being interconnected by an intermediate section, and the radial height or width of the cross-section of the annular sealing member may then be a maximum at the intermediate section. By suitably selecting the mutual actual positions of the intermediate section of the outer peripheral surface and the contact section of the inner peripheral surface of the sealing member, the radial compressive force applied the compressive ring may be optimized so as to obtain an optimum sealing effect. In a preferred embodiment, the first section at least along an axial length of from 0.3 to 0.7 times the total axial length of the sealing member measured from said second end surface defines an angle of between 0° and 20° with the longitudinal axis of the sealing member.

According to a second aspect, the present invention provides an annular sealing member of resilient material for sealing a space, which extends between high and low pressure areas and which is defined between a first apparatus part and a cylindrical surface of a second apparatus part, said sealing member having a radially outer peripheral surface extending between axially opposite first and second end surfaces for facing said high and low pressure areas, respectively, and a radially inner peripheral surface for sealing engagement with the cylindrical surface of the second apparatus part at a contact area and for defining, with the cylindrical surface, a first space widening for said contact area towards the low pressure area, the axial sectional view of at least part of the outer peripheral surface of the annular sealing member, which is adapted to come into contact with the compression ring, defining such convex contour that in an unstressed condition of the sealing member the radial distance between such part of the outer peripheral surface and the radially innermost part of the inner peripheral surface is decreasing in an axial direction towards the second end surface, the radius or radii of curvature of the convex shape being at least 0.4 times the total axial length or width of the annular sealing member. Because a convex shape does not have sharp edges, the useful lifetime of the sealing member and of the compression ring co-operating therewith is extended.

International Publication WO 92/15807 discloses a sealing arrangement comprising an annular sealing member. The sealing member has a radially inner peripheral surface which is divided into three axial sections, namely a first section adjacent to the high pressure area, an intermediate section forming a predetermined contact area, and a second section adjacent to the low pressure area. The first section is defined by a stepped part having an inner diameter substantially exceeding the outer diameter of a cylindrical surface of a second apparatus part or piston rod. The intermediate predetermined contact area is adapted to be in sealing engagement with the outer cylindrical surface of the piston rod, and the second section is a conical surface defining a widening or diverging space together with the outer cylindrical surface of the piston rod. In the known sealing arrangement the borderline between the contact area and the second section of the inner peripheral surface part of the sealing member is defined by an annular edge. However, when the pressure difference exceeds a certain value, for example on the order of 300 bar, and/or when the temperature becomes excessively high, the sealing member may tend to tilt about the edge or to deform such that part of the second section of the inner peripheral surface part of the annular sealing member comes into contact with the outer cylindrical surface of the second apparatus part. This may result not only in a less efficient sealing effect, but also in so-called extrusion damages of the sealing member.

The present invention solves these problems. Thus, the present invention provides a sealing arrangement for sealing a space, which extends between high and low pressure areas and which is defined between a first apparatus part and a cylindrical surface of a second apparatus part, the first and second apparatus parts being mutually moveable in a reciprocating manner along the axis of the cylindrical surface, the sealing arrangement comprising an annular sealing member of resilient material having a radially outer peripheral surface extending between axially opposite first and second end surfaces facing the high and low pressure areas, respectively, and a radially inner peripheral surface for sealing engagement with the cylindrical surface of the second apparatus part at a contact area, and for defining with the cylindrical surface a first space widening from the contact area toward the low pressure area; and annular compression means for pressing the inner peripheral surface thereof into close contact with the cylindrical surface of the second apparatus part at the contact area; the widening space being defined by an inner peripheral surface section extending between the contact area and the second end surface, the axial sectional view of the surface section defining a convex, rounded contour with a radius or radii of curvature selected so as to improve the sealing characteristics of the sealing member.

The annular compression means may, for example, comprise a compression ring engaging with the radially outer peripheral surface of the sealing member. The outer peripheral surface of the annular sealing member may have a linear or convex cross-sectional shape. Alternatively, the outer peripheral surface of the sealing member may comprise a concave surface part engaging with a complementary convex surface part of the annular compression means.

The annular compression means may be a compression ring made from an elastomeric material and having a solid cross-section. The compression ring may then be divided into a pair of axially juxtaposed annular members. Alternatively, the compression means may be made from metal. such as a helically wound wire. Furthermore, the annular sealing member need not be a single uniform part, but may be divided into two or more parts having mutually engaging complementary surface parts. Such sealing member parts maybe separate or bound together and may be made from materials having different characteristics.

According to another embodiment, the compression means may be positioned within a pocket, which is defined within the annular sealing member and which opens into the first end surface of the sealing member. As an example, the compression means may then be an annular metal spring member having a U-shaped cross-section tending to open the pocket and thereby expand the cross-section of the sealing member radially.

In the preferred embodiment, the radius or radii of curvature is/are within the range of from 0.15 to 1.5, preferably 0.2 to 0.6, and more preferably approximately 0.3, times the total axial length or width of the sealing member. By selecting an axial contour of the inner peripheral surface of the annular sealing member with such predetermined convex, rounded contour, improved sealing characteristics may be obtained, especially in case of an excessive pressure difference between the high and low pressure areas and/or at high temperatures.

As mentioned above, the inner peripheral surface of the annular sealing member may be divided into three parts each extending along a fraction of the total axial length of the annular sealing member. As an example, the inner surface section defining the widening space and being adjacent to the second end surface of the sealing member preferably does not have an axial length exceeding 0.3 times the total axial length of the sealing member. The contact of area of the inner peripheral surface part is preferably located within the axial length range of from 0.2 to 0.6 times the total axial length of the sealing member measured from the second end surface. Furthermore, this contact area preferably defines a convex, rounded contour with a radius or radii of curvature within the range of from 2 to 5 times the total axial length of the sealing member. The outer peripheral surface of the annular sealing member may be shaped as previously explained.

The present invention further provides an annular sealing member of resilient material for sealing a space, which extends between high and low pressure areas and which is defined between a first apparatus part and a cylindrical surface of a second apparatus part, the first and second apparatus parts being mutually moveable in a reciprocating manner along the axis of the cylindrical surface, the sealing member having a radially outer peripheral surface extending between axially opposite first and second end surfaces for facing the high and low pressure areas, respectively, and a radially inner peripheral surface adapted to be pressed into sealing engagement with the cylindrical surface of the second apparatus part at a contact area and for defining with the cylindrical surface a first space widening from the contact area toward the low pressure area, the widening space being defined by an inner peripheral surface section extending between the contact area and the second end surface, the axial sectional view of the surface section defining a convex, rounded contour with a radius or radii of curvature selected so as to improve the sealing characteristics of the sealing member. Such sealing member may, for example, be used in a sealing arrangement as described above.

BRIEF DESCRIPTION OF THE DRAWINGS

The invention will now be further described with reference to the drawings, wherein.

DETAILED DESCRIPTION OF THE INVENTION

Figure 1:
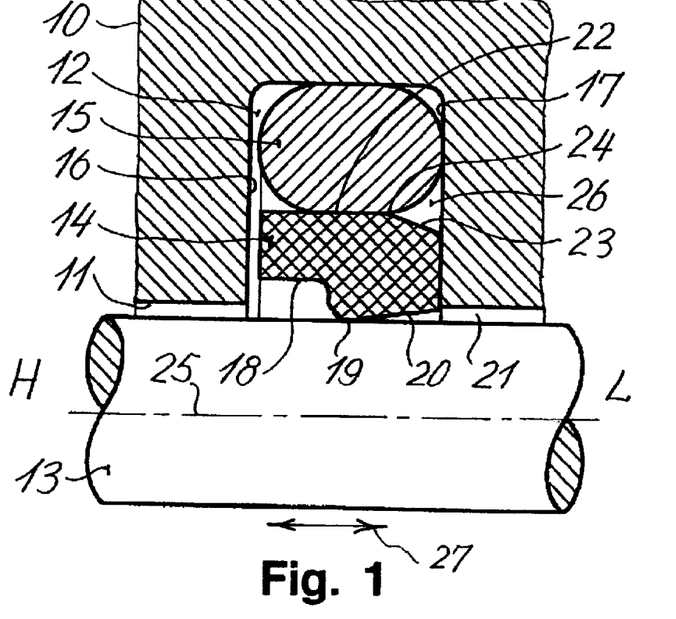
FIG. 1 is a partial sectional view of a known sealing arrangement.

FIG. 1 shows a known sealing arrangement of the type disclosed in WO 92/15807. The sealing arrangement shown in FIG. 1 comprises a housing wall 10 having a through bore 11 formed therein. An annular channel or groove 12 is formed in the housing wall 10 and opens into the bore 11. A cylindrical rod 13, such as a piston rod, extends through the bore 11 and may perform a reciprocating axial movement in relation to the housing wall 10. The bore 11 extends between a high pressure side H and a low-pressure side L. As an example, the rod 13 may be a piston rod having its high pressure end connected to a double acting piston which is arranged within a cylinder (not shown) and the wall 10 may then be part of a cylinder housing.

An annular sealing member or a sealing ring 14 having an inner peripheral surface engaging with the cylindrical outer surface of the piston rod 13 is arranged within the annular channel 12. This channel also contains a compression ring 15, such as an O-ring of an elastomeric material or a ring comprising spring means. The compression ring 15 is surrounding the annular sealing member 14 and is in engagement with the outer peripheral surface thereof so as to press the sealing member 14 radially inwardly into tight sealing contact with the outer surface of the piston rod.

The annular channel 12 is defined between a pair of axially spaced, opposite first and second end walls 16 and 17, respectively, which are positioned adjacent to the high and low pressure sides H and L, respectively. Because the pressure at the high pressure side H is usually much higher than the pressure at the low pressure side, the annular sealing member 14 and the compression ring 15 are usually pressed into tight contact with the second end wall 17 as shown in the drawings. The inner peripheral surface of the annular sealing member 14 may be divided into three axial sections, namely a first, stepped section 18 adjacent to the first end surface 16 of the channel 12, an intermediate contact section 19 and a second diverging section adjacent to the second end surface 17 of the channel 12. The first stepped section 18 has an inner diameter substantially exceeding the outer diameter of the piston rod 13. The contact section 19 is pressed into tight sealing engagement with the outer surface of the piston rod 13, and the second, diverging section 20 defines, together with the outer surface of the piston rod 12, a space widening or diverging toward the low pressure side L of the second end surface 17 of the channel 12.

The purpose of the sealing arrangement shown is to prevent or counteract leakage of liquid fluid from the high pressure side H to the low pressure side L via the annular space 21 which is defined between the outer cylindrical surface of the piston rod 13 and the inner surface of the bore 11. The purpose of the first stepped section 18 is to obtain the same fluid pressure on the inner and outer sides of this axial part of the sealing member 14 so as to some extent balance the influence of the fluid pressure on the high pressure side on the sealing member 14 and the compression ring 15. The fluid pressure on the high pressure side H does, however, tend to force the elastomeric compression ring 15 toward the low pressure side L and to deform the cross-sectional shape of the ring in accordance with the shape of the free space available within the channel 12. Liquid fluid may succeed in leaking from the high pressure side to the low pressure side and thereby passing the contact section 19 during a pressure stroke in which the piston rod 13 is moving to the right in FIG. 1. However, when the direction of movement of the piston rod is reversed, the leaked fluid is moved through a converging space and may succeed in passing the contact section 19, especially when the pressure difference between the high and low pressure sides has been substantially reduced.

The radially outer peripheral surface of the annular sealing member 14 may be divided into two axial sections, namely a first section or a contact section 22 usually contacting the compression ring 15, and a second section or pressure relief section 23. In the known embodiment shown in FIG. 1 the axial contour of the outer peripheral surface of the sealing member defines an obtuse angle defining an annular edge 24 of the outer peripheral surface of the sealing member. Furthermore, while the contact section 22 extends substantially parallel with the central axis of the piston rod, the relief section 23 is converging with the axis 25 so as to define a space 26 between the sealing member 14, the compression ring 15, and the second end surface 17 of the channel 12.

During operation, the piston rod 13 is reciprocating in relation to the housing or wall 10, and the pressure difference between the high-pressure side H and the low-pressure side L is varying considerably. Therefore, deformation of the elastomeric compression ring or O-ring is varying all the time so that the available space 26 is more or less filled out by the compression ring. Because of the chamfer defined by the pressure relief section 23, the radially inwardly directed pressure applied to the sealing member 14 by the compression ring 15 is concentrated substantially opposite to the contact section 19 even when the compression ring 15 is pressed into the free space 26. It has been found, however, that the compression ring 15 has to be replaced relatively frequently in order to maintain the sealing characteristics of the sealing arrangement. This is probably due to the relative movements of the sealing member 14 and the compression ring 15 around the annular edge 24 between the contact section 22 and the relief section 23 of the outer peripheral surface of the sealing member 14.

Figure 2:
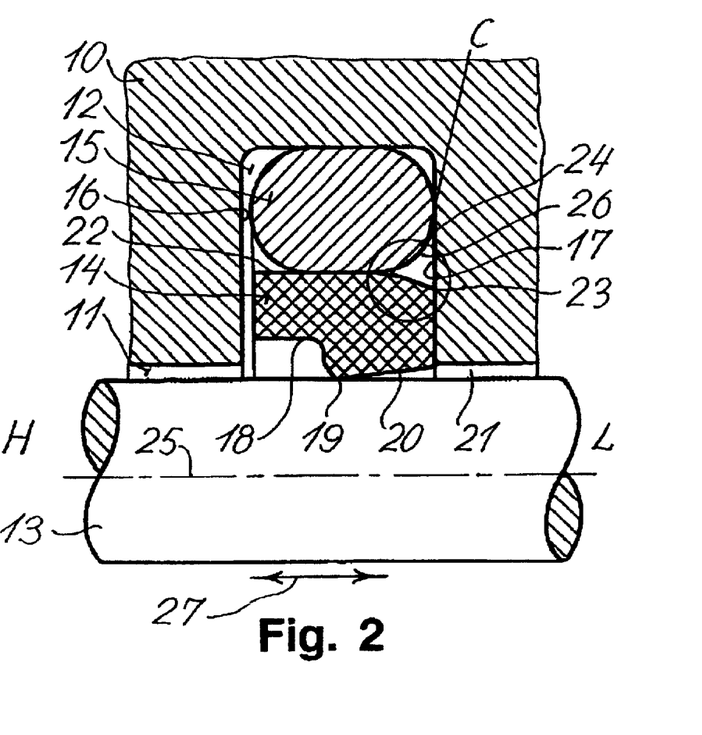
FIG. 2 is a partial sectional view of a sealing arrangement according to the invention.
Figure 3:
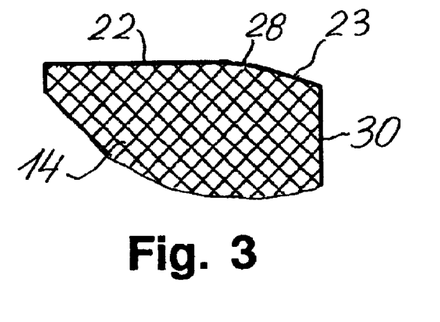
FIGS. 3–8 fragmentary sectional views showing various embodiments of the part of the sealing member indicated by a circle C in FIG. 2.
Figure 4:
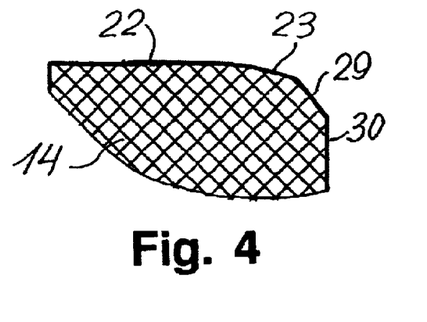
Figure 5:
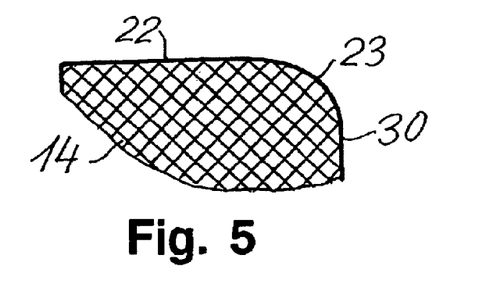
Figure 6:
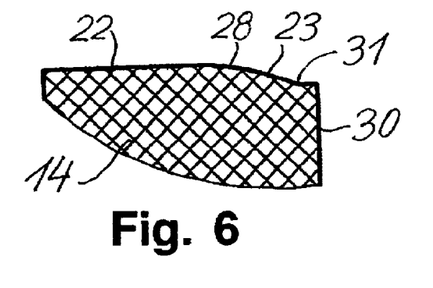
Figure 7:
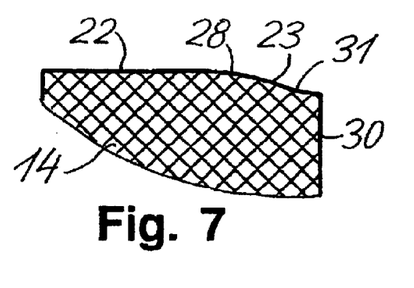
Figure 8:
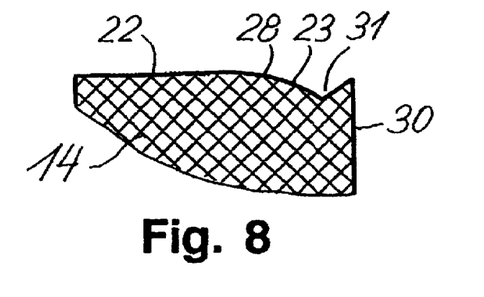

FIG. 2 shows an embodiment of the sealing arrangement according to the invention which corresponds to the known arrangement described above with reference to FIG. 1 with the exception that the shape of the outer peripheral surface of the sealing member 14 has been modified in the area indicated by a circle C in FIG. 2. In FIG. 3 the annular edge 24 has been replaced by a rounded convex contour 28 having a radius of curvature of approximately 0.85 time L, where L is the total axial length of the sealing member 14. In the embodiment shown in FIG. 4, the relief section 23 defines a rounded contour terminating into a chamfered part 29. FIG. 5 shows an embodiment in which the contour of the pressure relief section 23 is an arc of a circle interconnecting the contact section 22 and the end surface 30 of the sealing member 14 which is in abutment with the second end surface 17 of the channel 12. FIGS. 6–8 show embodiments in which the convex contour defined by the section 22 and 23 merges into a concave section 31 adjacent to the end surface 30. In FIGS. 6 and 7 the convex contour 28 merges into the concave section 31 such that the tangent inclination changes gradually. In FIG. 8, however, the concave section 31 defines an acute angle.

In a sealing arrangement of the type shown in FIG. 2 having an annular sealing member 14 shaped in accordance with any of FIGS. 3–8, the useful life of the compression ring 15 is substantially prolonged and the sealing efficiency of the sealing arrangement is improved.

Figure 9:
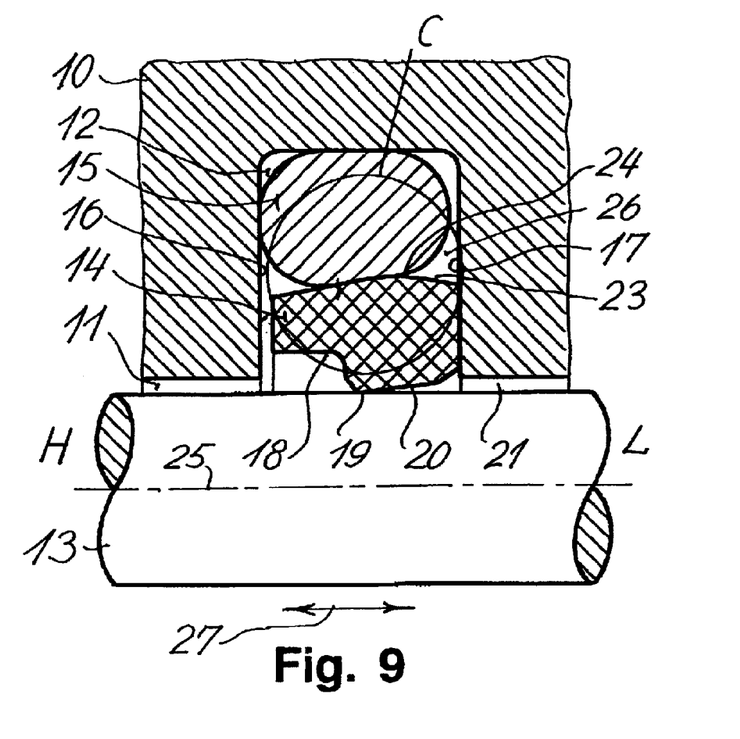
FIG. 9 is a partial sectional view of a further embodiment of the sealing arrangement according to the invention.
Figure 10:
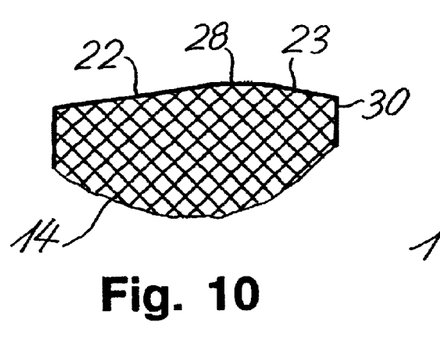
FIGS. 10 and 11 are fragmentary sectional views of various embodiments of the part of the sealing member indicated by the circle C in FIG. 9.
Figure 11:
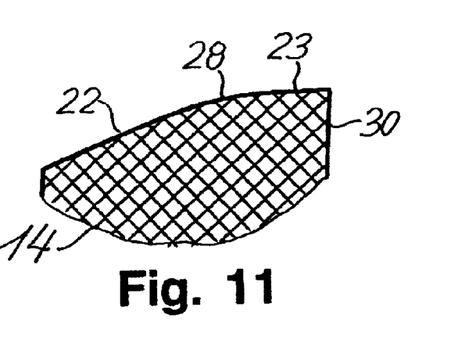

FIG. 9 shows an embodiment corresponding to the embodiment shown in FIG. 2. The only difference is found in the shape of the outer peripheral surface of the sealing member 14. The sealing member 14 of FIG. 9 is also shown in FIG. 10. The sealing member 14 shown in FIGS. 9 and 10 differs from that shown in FIG. 2 by the fact that in FIGS. 9 and 10 the contact surface 22 as well as the pressure relief section 23 define acute angles with the longitudinal axis 25 of the piston rod 13, while the contact section 22 is substantially parallel with the axis 25 in the embodiment shown in FIG. 2. In FIG. 10 the maximum radial thickness or height of the sealing member 14 is found intermediate of the contact section 22 and the relief section 23. However, in the embodiment shown in FIG. 11, the radial thickness or height of the sealing member 14 gradually increases toward the end surface 30.

Figure 12:
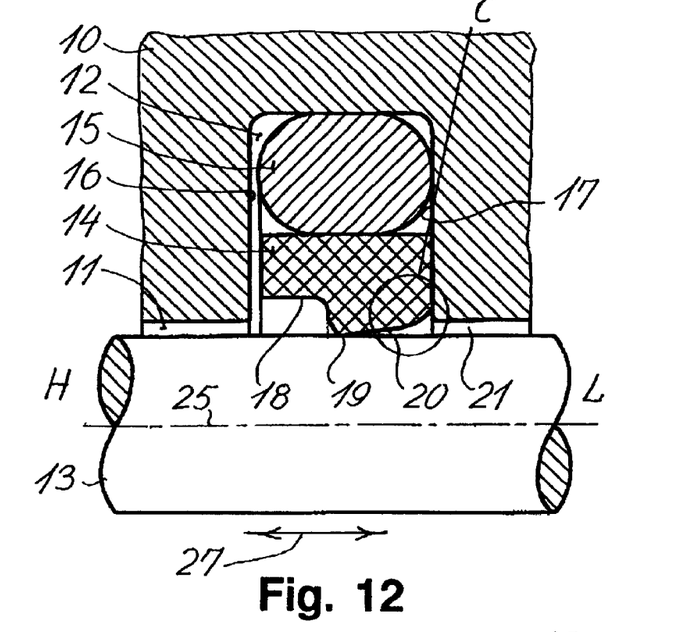
FIG. 12 is a partial sectional view of a still further embodiment of the sealing arrangement according to the invention.
Figure 13:
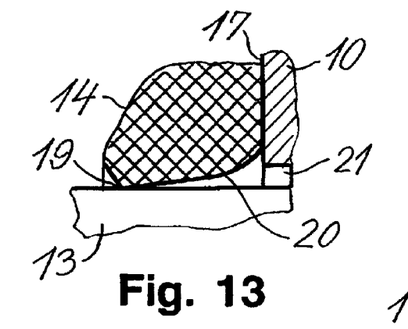
FIGS. 13–15 are fragmentary sectional views showing various embodiments of the pa of the sealing arrangement indicated by the circle C in FIG. 13.
Figure 14:
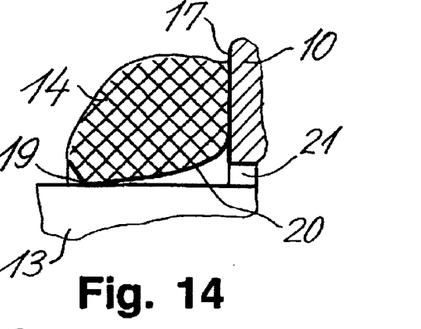
Figure 15:
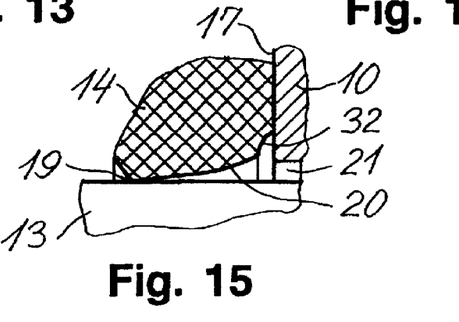

In the embodiment shown in FIG. 12, the outer peripheral surface of the sealing member 14 is shown as a circular cylindrical surface. It should be understood, however, that this surface could have any of the shapes shown in FIGS. 3–8, 10 and 11. In the embodiment shown in FIG. 12, the contour of the diverging section 20 of the inner peripheral surface of the sealing member 14 has a convex rounded contour selected so as to improve the sealing characteristics of the sealing member. In the embodiment shown in FIGS. 13 and 14, the axial contour of the diverging section 20 is totally convex. In the embodiment shown in FIG. 15, however, the convex diverging section 20 merges into a concave section 32 which reduces the risk of extrusion of the material of the sealing member 14 into the space 21.

FIGS. 16–19 are partial sectional views corresponding to those shown in FIGS. 2, 9 and 12, illustrating further embodiments of the sealing arrangement according to the invention. In the various embodiments, similar parts have been designated the same reference numerals.

Figure 16:
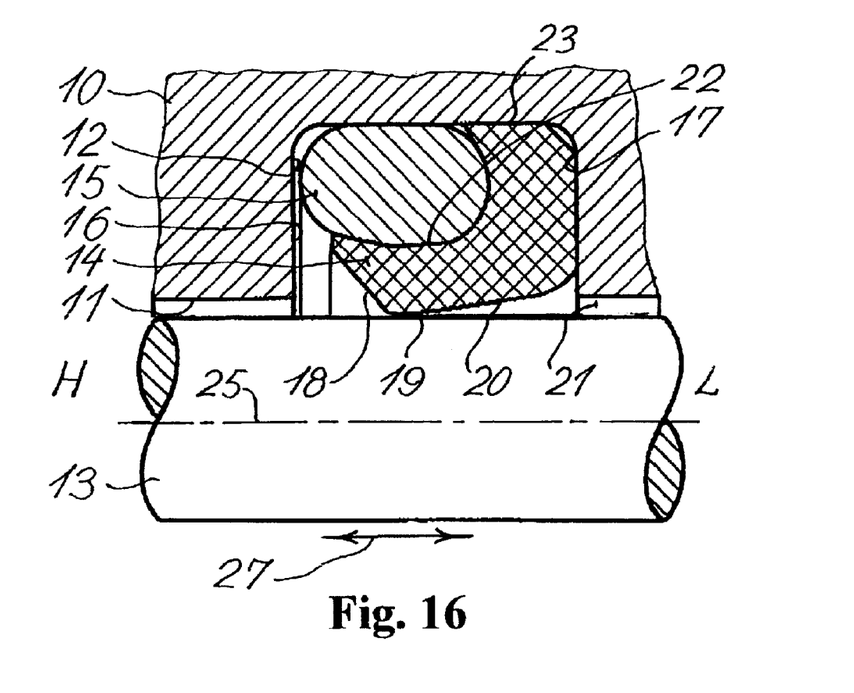
FIGS. 16–19 are fragmentary sectional views of still further embodiments of the sealing arrangement according to the invention.

In the embodiment shown in FIG. 16, the contact section 22 of the outer peripheral surface of the sealing member 14 defines a concave surface part as being complementary to the abutting convex surface part of the compression ring 15, and the second section or pressure relief section 23 may engage with or be located closely to the inner peripheral wall of the channel 12. In FIGS. 16–19, the first section 18 of the inner peripheral surface of the sealing member 14 is not stepped, but rather defines an inner frusto-conical surface defining, with the longitudinal axis 25, an angle substantially exceeding the angle defined by the diverging section 20.

Figure 17:
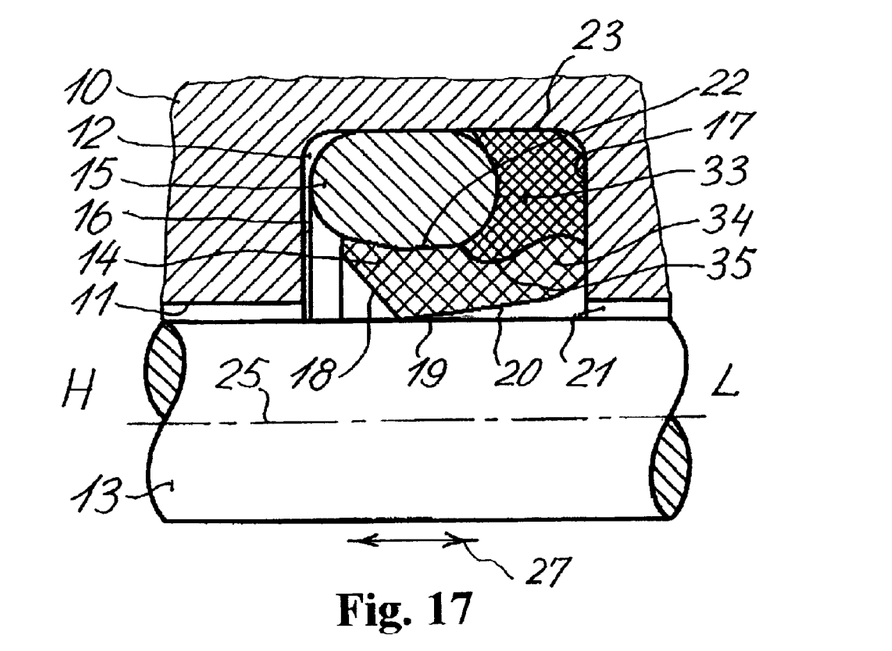

The embodiment illustrated in FIG. 17 is similar to that shown in FIG. 16. However, in FIG. 17 the annular sealing member 14 is divided into two mutually engaging annular parts 33 and 34, respectively. These parts may be made from different materials having different characteristics. Adjacent complementary surface parts of the annular parts 33 and 34 may be bound together by an adhesive layer 35 or by other means so as to form an integral sealing member 14, or the parts 33 and 34 may be separate.

Figure 18:
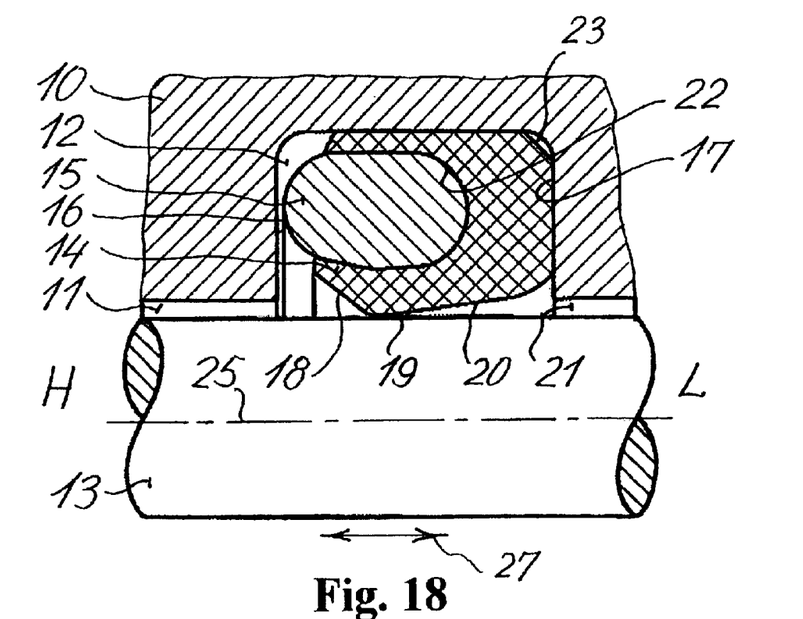

In the embodiment shown in FIG. 18, the contact section 22 of the sealing member 14 in contact with the compression ring 15 defines an annular pocket having an opening opposite to the first end wall 16 of the channel 12. The radially outer peripheral wall of the sealing member may then contact or be positioned closely adjacent to the inner peripheral wall of the channel 12.

Figure 19:
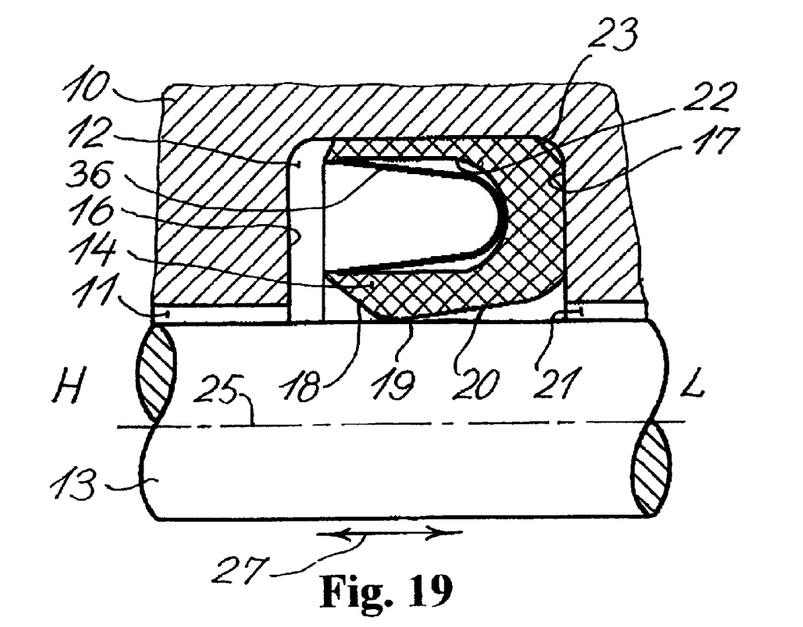

The embodiment of the sealing arrangement shown in FIG. 19 differs from that shown in FIG. 18 by the feature that in FIG. 19 the elastomeric compression ring shown in FIG. 18 has been replaced by a compression ring 36 having a U-shaped cross-section. The compression ring 36 may be made from elastic metal, plastic or any other suitable material. When the compression ring 36 is mounted in the pocket formed in the sealing member 14 by the contact section 22, the legs of the U-shaped cross-section are resiliently pressed towards each other. This means that in its mounted condition, the compression ring 36 is biasing the contact section 19 of the sealing member 14 into sealing engagement with the piston rod 13, and at the same time the outer peripheral surface of the sealing member is biassed toward the adjacent inner peripheral surface of the channel 12.

It should be understood that the various embodiments described above could be combined in any desired manner. Furthermore, the annular channel or groove 12 in which the sealing member 12 and the compression ring 15 are arranged could be formed in the outer cylindrical surface of a piston or a similar member, and such piston could co-operate with a cylindrical wall or bore.

What is claimed is:

1. A sealing arrangement for sealing a space, which extends between high and low pressure areas and which is defined between a first apparatus part and a cylindrical surface of a second apparatus part, the first and second apparatus parts being mutually moveable in a reciprocating manner along the axis of said cylindrical surface, said sealing arrangement comprising:

an annular sealing member of resilient material having a radially outer peripheral surface extending between axially opposite first and second end surfaces facing said high and low pressure areas, respectively, and a radially inner peripheral surface for sealingly engaging with the cylindrical surface of the second apparatus part at a contact area and for defining with the cylindrical surface a first space widening or diverging from said contact area toward the low pressure area; and a compression ring surrounding the annular sealing member, the compression ring being in contact with the outer peripheral surface of the annular sealing member so as to press the inner peripheral surface thereof into close contact with the cylindrical surface of the second apparatus part at said contact area;

the axial sectional view of at least part of the outer peripheral surface of the annular sealing member coming into contact with the compression ring defining a convex contour that in an unstressed condition of the sealing member the radial distance between the convex contour of the outer peripheral surface and a radially innermost part of the inner peripheral surface is decreasing in an axial direction toward the second end surface and the low pressure area, the convex contour having a radius of curvature at least 0.4 times the total axial length of the annular sealing member.

2. A sealing arrangement according to claim 1, wherein the radius of curvature is at least 0.6 times the total axial length of the annular sealing member.

3. A sealing arrangement according to claim 1, wherein the convex axial sectional contour of the outer peripheral surface part continuously merges into a concave sectional contour adjacent to the second end surface of the sealing member.

4. A sealing arrangement according to claim 3, wherein the convex contour merges into the concave contour at an inflexion spaced from said second end surface by a distance of 0.05–0.25 times the total axial length of the sealing member.

5. A sealing arrangement according to claim 3, wherein an end part of the sectional contour adjacent to the second end surface of the sealing member and the longitudinal axis of the sealing arrangement defines there between an angle of from −10° to +45°.

6. A sealing arrangement according to claim 1, wherein the radially inner peripheral surface of the sealing member includes a first section, which extends between the first end surface of the sealing member and the contact area, and which has a minimum diameter substantially exceeding the maximum diameter of a second section of the inner peripheral surface defining said gradually widening or diverging space.

7. A sealing arrangement according to claim 1, wherein the annular sealing member and the compression ring are arranged within an annular channel or groove which is formed in the first apparatus part and defines an annular opening opposite to the cylindrical surface of the second apparatus part, said channel having a bottom wall for sealingly engaging with the compression ring, and opposite first and second side walls positioned opposite to the first and second end surfaces, respectively, of the sealing member.

8. A sealing arrangement according to claim 1, wherein the outer peripheral surface of the sealing member defines the convex axial contour having a first section adjacent to the first end surface of the sealing member and a second section adjacent to the second end surface of the sealing member, the first and second sections being interconnected by an intermediate section, the radial height of the cross-section of the annular sealing member being maximum at said intermediate section.

9. A sealing arrangement according to claim 8, wherein said first section, at least along an axial length of from 0.3 to 0.7 times the total axial length of the sealing member measured from said second end surface, defines an angle of between 0° and 20° with the longitudinal axis of the sealing member.

10. An annular sealing member of resilient material for sealing a space, which extends between high and low pressure areas and which is defined between a first apparatus part and a cylindrical surface of a second apparatus part, said sealing member having a radially outer peripheral surface extending between axially opposite first and second end surfaces for facing said high and low pressure areas, respectively, and a radially inner peripheral surface for sealingly engaging with the cylindrical surface of the second apparatus part at a contact area and for defining with the cylindrical surface a first space widening from said contact area toward the low pressure area, the axial sectional view of at least part of the outer peripheral surface of the annular sealing member, which is adapted to come into contact with a compression ring, defining a convex contour that in an unstressed condition of the sealing member the radial distance between the convex contour of the outer peripheral surface and a radially innermost part of the inner peripheral surface is decreasing in an axial direction toward the second end surface, the convex contour having a radius of curvature at least 0.4 times the total axial length of the annular sealing member.

11. A sealing member according to claim 10, wherein the radius of curvature is at least 0.6 times the total axial length of the annular sealing member.

12. A sealing member according to claim 10, wherein the convex axial sectional contour of the outer peripheral surface part continuously merges into a concave sectional contour adjacent to the second end surface of the sealing member.

13. A sealing member according to claim 12, wherein the convex contour merges into the concave contour at an inflexion spaced from said second end surface by a distance of 0.05–0.25 times the total axial length of the sealing member.

14. A sealing member according to claim 12, wherein an end part of the sectional contour adjacent to the second end surface of the sealing member and the longitudinal axis of the sealing arrangement defines therebetween an angle of from −10° to +45°.

15. A sealing member according to claim 10, wherein the radially inner peripheral surface includes a first section, which extends between the first end surface of the sealing member and the contact area and which has a minimum diameter substantially exceeding the maximum diameter of a second section of the inner peripheral surface defining said gradually widening space.

16. A sealing member according to claim 10, wherein the outer peripheral surface of the sealing member defines the convex axial contour having a first section adjacent to the first end surface of the sealing member and a second section adjacent to the second end surface of the sealing member, the first and second sections being interconnected by an intermediate section, the radial height of the cross-section of the annular sealing member being maximum at said intermediate section.

17. A sealing member according to claim 16, wherein said first section defines an angle of between 0° and 20° with the longitudinal axis of the sealing member.

18. A sealing member according to claim 16, wherein the said first section extends along an axial length of from 0.3 to 0.7 times the total axial length of the sealing member measured from said second end surface.

19. A sealing arrangement for sealing a space, which extends between high and low pressure areas and which is defined between a first apparatus part and a cylindrical surface of a second apparatus part, the first and second apparatus parts being mutually moveable in a reciprocating manner along the axis of said cylindrical surface, said sealing arrangement comprising:

an annular sealing member of resilient material having a radially outer peripheral surface extending between axially opposite first and second end surfaces facing said high and low pressure areas, respectively, and a radially inner peripheral surface for sealingly engaging with the cylindrical surface of the second apparatus part at a contact area and for defining with the cylindrical surface a first space widening from said contact area toward the low pressure area, and annular compression means for pressing the inner peripheral surface of the sealing member into close contact with the cylindrical surface of the second apparatus part at said contact area, said first widening space being defined by an inner peripheral surface section extending between the contact area and the second end surface, an axial sectional view of the contact area of the inner peripheral surface defining a convex, rounded contour with a radius of curvature within the range of from 2 to 5 times the total axial length of the sealing member, and being selected so as to improve the sealing characteristics of the sealing member.

20. A sealing arrangement according to claim 19, wherein the annular compression means comprises a compression ring engaging with the radially outer peripheral surface of the sealing member.

21. A sealing arrangement according to claim 19, wherein the outer peripheral surface of the annular sealing member comprises a concave surface part engaging with a complementary convex surface part of the annular compression means.

22. A sealing arrangement according to claim 19, wherein the annular sealing member is divided into two or more parts having mutually engaging complementary surface parts.

23. A sealing arrangement according to claim 19, wherein the compression means is positioned within a pocket, which is defined within the annular sealing member and which opens at said first end surface of the sealing member.

24. A sealing arrangement according to claim 19, wherein the radius of curvature is within the range of from 0.15 to 1.5 times the total axial length of the sealing member.

25. A sealing arrangement according to claim 24, wherein the radius of curvature is within the range of from 0.2 to 0.6 times the total axial length of the sealing member.

26. A sealing arrangement according to claim 25, wherein the radius of curvature is approximately 0.3 times the total axial length of the sealing member.

27. A sealing arrangement according to claim 19, wherein the widening space defined by the inner surface section with the rounded contour extends from the second end surface along an axial length not exceeding 0.3 times the total axial length of the sealing member.

28. A sealing arrangement according to claim 19, wherein the contact area is located within the axial length range of from 0.2 to 0.6 times the total axial length of the sealing member measured from said second end surface.

29. A sealing arrangement according to claim 20, wherein the axial sectional view of at least part of the outer peripheral surface of the annular sealing member coming into contact with the compression ring defines a convex contour that in an unstressed condition of the sealing member the radial distance between the convex contour of the outer peripheral surface and a radially innermost part of the inner peripheral surface is decreasing in an axial direction toward the second end surface and the low pressure area, the convex contour having a radius of curvature at least 0.4 times the total axial length of the annular sealing member.

30. A sealing arrangement according to claim 29, wherein the radius of curvature is at least 0.6 times the total axial length of the annular sealing member.

31. A sealing arrangement according to claim 29, wherein the convex axial sectional contour of the outer peripheral surface part continuously merges into a concave sectional contour adjacent to the second end surface of the sealing member.

32. A sealing arrangement according to claim 31, wherein the convex contour merges into the concave contour at an inflexion spaced from said second end surface by a distance being 0.05–0.25 times the total axial length of the sealing member.

33. A sealing arrangement according to claim 31, wherein an end part of the sectional contour adjacent to the second end surface of the sealing member and the longitudinal axis of the sealing arrangement defines there between an angle of from −10° to +45°.

34. A sealing arrangement according to claim 29, wherein the radially inner peripheral surface of the sealing member includes a first section, which extends between the first end surface of the sealing member and the contact area, and which has a minimum diameter substantially exceeding the maximum diameter of a second section of the inner peripheral surface defining said gradually widening or diverging space.

35. A sealing arrangement according to claim 29, wherein the annular sealing member and the compression ring are arranged within an annular channel or groove which is formed in the first apparatus part and defines an annular opening opposite to the cylindrical surface of the second apparatus part, said channel having a bottom wall for sealingly engaging with the compression ring and opposite first and second side walls positioned opposite to the first and second end surfaces, respectively, of the sealing member.

36. An annular sealing member of resilient material for sealing a space, which extends between high and low pressure areas and which is defined between a first apparatus part and a cylindrical surface of a second apparatus part, the first and second apparatus parts being mutually moveable in a reciprocating manner along the axis of said cylindrical surface, said sealing member having a radially outer peripheral surface extending between axially opposite first and second end surfaces for facing said high and low pressure areas, respectively, and a radially inner peripheral surface adapted to be pressed into sealing engagement with the cylindrical surface of the second apparatus part at a contact area and for defining with the cylindrical surface a first space widening from said contact area toward the low pressure area, said first widening space being defined by an inner peripheral surface section extending between the contact are and the second end surface, an axial sectional view of the contact area of the inner peripheral surface defining a convex, rounded contour with a radius of curvature within the range of from 2 to 5 times the total axial length of the sealing member, and selected so as to improve the sealing characteristics of the sealing member.

37. A sealing member according to claim 36, wherein the radius of curvature is within the range of from 0.15 to 1.5 times the total axial length of the sealing member.

38. A sealing member according to claim 37, wherein the radius of curvature is within the range of from 0.2 to 0.6 times the total axial length of the sealing member.

39. A sealing member according to claim 38, wherein the radius of curvature is approximately 0.3 times the total axial length of the sealing member.

40. A sealing member according to claim 36, wherein the widening space defined by the inner surface section with the rounded contour extends from the second end surface along an axial length not exceeding 0.3 times the total axial length of the sealing member.

41. A sealing member according to claim 36, wherein the contact area is located within the axial length range of from 0.2 to 0.6 times the total axial length of the sealing member measured from said second end surface.

42. A sealing member according to claim 36, wherein the axial sectional view of at least part of the outer peripheral surface of the annular sealing member adapted to come into come into contact with a surrounding compression ring defines a convex contour that in an unstressed condition of the sealing member the radial distance between the convex contour of the outer peripheral surface and a radially innermost part of the inner peripheral surface is decreasing in an axial direction toward the second end surface and the low pressure area, the convex contour having a radius of curvature at least 0.4 times the axial length of the annular sealing member.

43. A sealing member according to claim 42, wherein the radius of curvature is at least 0.6 times the axial length of the annular sealing member.

44. A sealing member according to claim 42, wherein the convex axial sectional contour of the outer peripheral surface part continuously merges into a concave sectional contour adjacent to the second end surface of the sealing member.

45. A sealing member according to claim 44, wherein the convex contour merges into the concave contour at an inflexion spaced from said second end surface by a distance of 0.05–0.25 times the total axial length of the sealing member.

46. A sealing member according to claim 44, wherein an end part of the sectional contour adjacent to the second end surface of the sealing member and the longitudinal axis of the sealing arrangement defines there between an angle of from −10° to +45°.

47. A sealing member according to claim 36, wherein the radially inner peripheral surface of the sealing member includes a first section, which extends between the first end surface of the sealing member and the contact area, and which has a minimum diameter substantially exceeding the maximum diameter of a second section of the inner peripheral surface defining said gradually widening or diverging space.

48. A sealing member according to claim 36, wherein the annular sealing member and the compression ring are arranged within an annular channel or groove which is formed in the first apparatus part and defines an annular opening opposite to the cylindrical surface of the second apparatus part, said channel having a bottom wall for sealingly engaging with the compression ring and opposite first and second side walls positioned opposite to the first and second end surfaces, respectively, of the sealing member.

49. An annular sealing member of resilient material for sealing a space, which extends between high and low pressure areas and which is defined between a first apparatus part and a cylindrical surface of a second apparatus part, the first and second apparatus parts being mutually moveable in a reciprocating manner along the axis of said cylindrical surface, said sealing member comprising:
   a radially outer peripheral surface extending between axially opposite first and second end surfaces for facing said high and low pressure areas, respectively, wherein an axial sectional view of at least part of the outer peripheral surface of the annular sealing member, which is adapted to come into contact with a surrounding compression ring, defines a convex contour such that in an unstressed condition of the sealing member the radial distance between the convex contour of the outer peripheral surface and a radially innermost part of the inner peripheral surface is decreasing in an axial direction toward the second end surface and the low pressure area, the convex contour having a radius of curvature at least 0.4 times the axial length of the annular sealing member, said convex contour of the outer peripheral surface continuously merging into a concave sectional contour adjacent to the second end surface of the sealing member and, a radially inner peripheral surface adapted to be pressed into sealing engagement with the cylindrical surface of the second apparatus part at a contact area and defining, with the cylindrical surface, a first space widening from said contact area toward the low pressure area, said first widening space being defined by an inner peripheral surface section extending between the contact area and the second end surface, an axial sectional view of said surface section defining a convex, rounded contour with a radius of curvature selected so as to improve the sealing characteristics of the sealing member.

\* \* \* \* \*